United States Patent Office 2,759,757
Patented Aug. 21, 1956

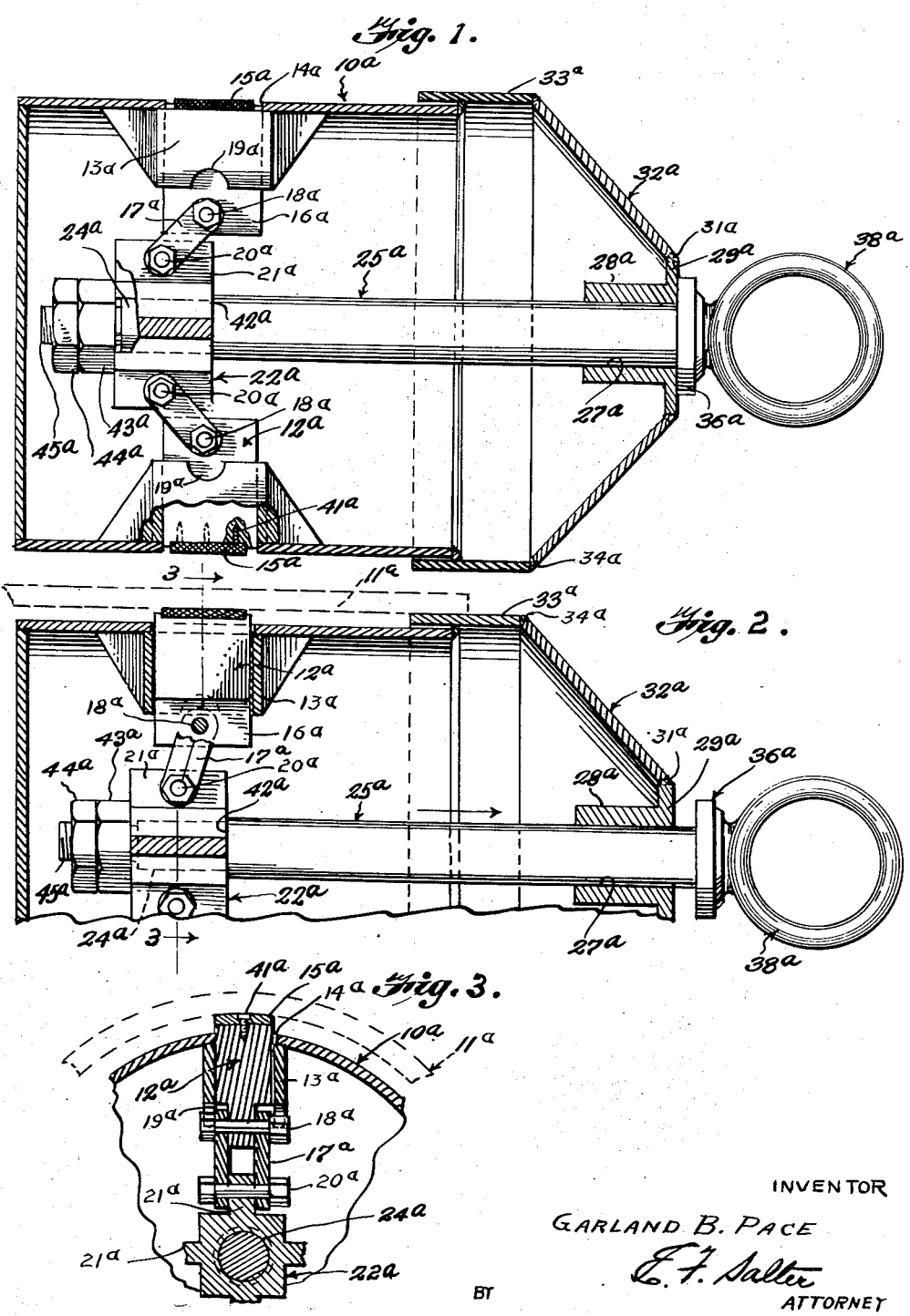

2,759,757

PIPE HANDLING MECHANISM

Garland B. Pace, Point Pleasant, W. Va., assignor to Pipe Line Construction and Drilling Company, Pineville, W. Va., a corporation of Delaware Original application November 14, 1946, Serial No. 709,819. Divided and this application September 15, 1952, Serial No. 309,574

1 Claim. (Cl. 294—93)

This invention relates to pipe handling equipment especially adapted for use in manipulating large size pipe, such as employed in oil, water and sewerage lines.

The present application is a division of my prior co-pending application Serial No. 709,819, filed November 14, 1946, now Patent No. 2,610,888, issued September 16, 1952.

An important object of the invention is to provide a pipe handling mechanism which may be readily inserted into and secured in one end of the pipe to be handled and having means enabling a hoisting or towing cable or chain to be connected thereto for hoisting, towing or otherwise manipulating the pipe.

Another object of the invention is to provide a mechanism of the character indicated which will protect and close the end of the pipe with which it is associated so as to prevent the entrance of foreign matter into the pipe while it is being hoisted or towed over the ground.

A further object of the invention resides in the provision of a pipe handling mechanism having means for camming it and the associated pipe over and away from obstructions, such as trees, rocks, etc., encountered in the towing or hoisting of the pipe.

Other objects and advantages will be apparent from the following description and the accompanying drawing, wherein:

Figure 1 is a longitudinal section taken through the improved device, and showing the locking or gripping dogs in retracted position.

Figure 2 is a fragmentary view similar to Figure 1 but showing the dogs in expanded position.

Figure 3 is a fragmentary transverse section taken substantially on the line 3—3 of Figure 2.

The pipe gripping dogs are expanded to grip the pipe by operation of a block forwardly along the axis of the device produced by the forward movement of a shaft, to the exposed forward end of which the pipe handling chain or cable is connected; and retraction of the pipe gripping dogs is accomplished by relaxing the pull on the chain or cable and pushing the shaft rearwardly.

Referring in detail to the drawing, wherein like numerals designate like parts throughout the same, the numeral 10a generally designates a cylindrical body or casing of small enough diameter to be inserted easily within the pipe end 11a with sufficient clearance for proper operation of the radially elongated, generally rectangular pipe gripping dogs 12a which slide radially inwardly and outwardly in braced rectangular tubular guides 13a preferably welded to the interior of the cylindrical body 10a in registry with openings 14a formed in the wall of the body at circumferentially spaced points.

The gripping dogs 12a have their outer ends provided with renewable lagging 15a held in place by suitable means, such as screws 41a. The inner ends 16a of the dogs are cut away on their opposite sides to accommodate links 17a which are pivotally connected to the reduced inner ends of the dogs by pivot bolts 18a. The inner edges of opposite side walls of the guides 13a have recesses 19a to accommodate the heads of the bolts 18a and thereby act as stops to prevent further expanding movement of the dogs 12a.

The inner ends of the links 17a are pivoted on the opposite ends of pivot bolts 20a which traverse arms 21a radiating from the sides of a substantially square link operating block 22a. It will be noted that in the retracted position of the dogs 12a the links 17a slant rearwardly and that this angulation becomes reduced toward a right angular relation to the operating block 22a as the dogs are expanded by movement of the operating block forwardly or to the right.

The operating block 22a has a smooth bore through which extends a smooth reduced portion 24a of the operating shaft 25a. The block abuts a shoulder 42a defined by the reduced shaft portion 24a and is locked by a nut 43a followed by a locknut 44a threaded on a rearward extension 45a of the shaft whereby the operating block 22a is secured against longitudinal movement along the operating shaft.

The stationary shaft supporting block 28a and disk 29a are integral and the bore 27a of the block 28a is smooth to slidably receive the smooth forward part of the operating shaft 25a. The shaft head 36a is in the form of an annulus to the forward end of which the circular eye 38a is fixed.

The disk 29a of the shaft supporting block 28a is welded at 31a to the smaller forward end of a frusto-conical nose 32a projecting forwardly from a short cylindrical portion or ring 33a to which its wider end is welded at 34a. The ring 33a is slightly larger in diameter than the body 10a and is welded thereto. This ring may be sized to abut the end of the pipe to be handled or to fit closely in such end and acts in conjunction with the nose 32a to prevent foreign matter from entering the pipe as it is hoisted or dragged over the ground. The conical nose 32a also functions to skid or cam the device and the associated pipe over and away from obstacles and consequently the pipe may be hoisted or towed along the ground without becoming lodged or trapped behind trees, rocks, and other obstructions.

In use, the body 10a of the device is inserted into one end of the pipe, with its diametrically enlarged portion 33a and conical nose closing the end of the pipe. Forward movement of the operating shaft 25a and consequently forward movement of the operating block 22a for expanding the dogs 22a against the inside of the pipe 11a is produced by a forward pull on the chain or cable attached to the eye 38a which is carried by the forward end of the operating shaft 25a, and rearward movement of the shaft 25a for retracting the dogs 12a is produced by pushing rearwardly upon the eye 38a.

I claim:

A pipe handling device comprising a substantially cylindrical body for insertion into one end of a pipe to be towed or hoisted, a conical nose on the front end of said body to cam the device and associated pipe over and away from obstacles encountered in hoisting or towing the pipe, radial guides mounted within said body and opening through the periphery thereof at circumferentially spaced points, radially extensible and retractable pipe gripping dogs working closely in said guides, an operating block arranged axially in said body, links extending between and pivotally connected to said operating block and said dogs at a rearward angulation so that forward movement of said operating block forces said dogs outwardly to grip the interior of the pipe and rearward movement of said operating block retracts said dogs away from the interior of the pipe, a supporting block mounted within the forward part of said conical nose and formed with an axial bore registering with an opening formed through said forward part of said conical nose, an axially movable operating shaft in said body and having a forward part slidably supported in the bore of said supporting block and projecting forwardly through the opening in said conical nose, said operating block having an axial bore through which said operating shaft extends, the portion of said shaft extending through the bore in said operating block being reduced in cross-section to form a shoulder against which one end face of said operating block abuts, means engaging the opposite end face of said operating block for securing said operating block to said shaft for axial movement therewith for extending and retracting said dogs, and a hoisting or towing eye on the forward end of said shaft.

References Cited in the file of this patent

UNITED STATES PATENTS

| | | |
|---|---|---|
| 880,404 | Sanford | Feb. 25, 1908 |
| 1,488,716 | Spitler | Apr. 1, 1924 |
| 1,508,417 | Spitler | Sept. 16, 1924 |
| 1,764,481 | Watkins | June 17, 1930 |
| 2,486,489 | McDermott | Nov. 1, 1949 |
| 2,595,902 | Stone | May 6, 1952 |
| 2,610,888 | Pace | Sept. 16, 1952 |